United States Patent
Solanki et al.

(10) Patent No.: US 12,287,637 B2
(45) Date of Patent: Apr. 29, 2025

(54) AUTONOMOUS PRODUCT PICKING SYSTEM AND METHOD

(71) Applicant: TE Connectivity Services GmbH, Schaffhausen (CH)

(72) Inventors: Swapnilsinh Solanki, Harrisburg, PA (US); Xinping Deng, Lancaster, PA (US); Jiankun Zhou, Mechanicsburg, PA (US); Roberto Francisco-Yi Lu, Bellevue, WA (US); Fabio E. Massaro, High Point, NC (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 17/037,879

(22) Filed: Sep. 30, 2020

(65) Prior Publication Data

US 2022/0100198 A1 Mar. 31, 2022

(51) Int. Cl.
*G05D 1/02* (2020.01)
*G05D 1/00* (2024.01)

(52) U.S. Cl.
CPC ......... *G05D 1/0225* (2013.01); *G05D 1/0016* (2013.01); *G05D 1/0022* (2013.01); *G05D 1/0217* (2013.01)

(58) Field of Classification Search
CPC .. G05D 1/0225; G05D 1/0016; G05D 1/0022; G05D 1/0217; G05D 2201/0216
See application file for complete search history.

(56) References Cited

U.S. PATENT DOCUMENTS

| | | | |
|---|---|---|---|
| 2015/0339923 A1* | 11/2015 | König | G08G 1/127 709/219 |
| 2017/0286884 A1* | 10/2017 | Shoval | G06Q 10/063114 |
| 2018/0060827 A1* | 3/2018 | Abbas | G05D 1/0285 |
| 2019/0066041 A1* | 2/2019 | Hance | G01C 21/343 |
| 2019/0095849 A1* | 3/2019 | Sweeney | G06Q 10/0834 |
| 2020/0090111 A1* | 3/2020 | Heil | G06Q 10/087 |
| 2020/0223635 A1* | 7/2020 | Govindaswamy | B65G 1/1375 |
| 2020/0231386 A1* | 7/2020 | Shiu | B66F 9/0755 |
| 2020/0286021 A1* | 9/2020 | Luckay | G06Q 10/08355 |
| 2020/0387154 A1* | 12/2020 | Sellner | G05D 1/0287 |
| 2021/0104161 A1* | 4/2021 | Dyer | H04L 67/52 |
| 2021/0318134 A1* | 10/2021 | Mukherjee | G08G 1/202 |

* cited by examiner

*Primary Examiner* — Sahar Motazedi

(57) ABSTRACT

An autonomous product picking system includes product pick up stations at different locations within a facility having call stations with activation buttons at a user interface activated by an operator to transmit call requests when the products are needed to be picked up and to transmit completion signals when the products have been picked up. An automatic guided vehicle is movable within the facility between the product pick up stations and a product drop off station. A system control module guides the AGV within the facility and includes a system communication module communicatively coupled to the AGV and the call stations. The system communication module receives the call requests and the completion signals from the call stations when the activation buttons are activated.

15 Claims, 3 Drawing Sheets

AUTONOMOUS PRODUCT PICKING SYSTEM AND METHOD

BACKGROUND OF THE INVENTION

The subject matter herein relates generally to systems and methods for distributing products in a facility.

Products are moved between various stations within a plant or warehouse as the products are manufactured, assembled and packaged. Efficient picking procedures are essential to ensure smooth flow of the products between the various stations. Inefficient picking procedures create excessive inventories at machines or stations, which result in inefficient floor space usage and chaos. Inefficient picking procedures also leads to wasted time of workers, which increases overall cost of operation. Inefficient picking procedures reduces productivity due to increased search time for the products. Typically, product picking is a manual process where an operator drives a vehicle between the various stations to pick up and deliver the products.

A need remains for efficient systems and methods for distributing products in a facility.

BRIEF DESCRIPTION OF THE INVENTION

In one embodiment, an autonomous product picking system is provided. The autonomous product picking system includes product pick up stations at different locations within a facility. The autonomous product picking system includes call stations associated with the product pick up stations. Each call station includes at least one activation button at a user interface configured to be activated by an operator to transmit call requests when the products are needed to be picked up from the product pick up station and to transmit completion signals when the products have been picked up from the product pick up stations. The autonomous product picking system includes at least one product drop off station, a docking station within the facility and an automatic guided vehicle movable within the facility between the product pick up stations, the at least one product drop off station, and the docking station. The autonomous product picking system includes a system control module for guiding the automatic guided vehicle within the facility between the product pick up stations, the at least one product drop off station and the docking station. The system control module includes a system communication module communicatively coupled to the automatic guided vehicles and the call stations. The system communication module receives the call requests from the call stations when the at least one activation button at the user interface is activated. The system communication module receives the completion signals from the call stations when the at least one activation button at the user interface is activated.

In another embodiment, an autonomous product picking system is provided. The autonomous product picking system includes product pick up stations at different locations within a facility, a docking station within the facility, automatic guided vehicles movable within the facility between the product pick up stations and the docking station, and a system control module for guiding the automatic guided vehicles within the facility between the product pick up stations and the docking station. The system control module includes a system communication module communicatively coupled to the automatic guided vehicles and the product pick up stations. The system communication module is configured to receive call requests from the product pick up stations when the products are needed to be picked up. The system communication module is configured to receive completion signals from the product pick up stations after the products have been picked up from the product pick up stations. The system control module includes a system controller comprising one or more processors configured to determine travel times of the automatic guided vehicles to the product pick up stations. The system control module includes one or more processors configured to send a pick up request to the automatic guided vehicle having the shortest travel time to the product pick up station having the call request after the call request is received. The system control module includes one or more processors configured to navigate the automatic guided vehicle that received the pick up request to the product pick up station where the products are picked up by the automatic guided vehicle. The system control module includes one or more processors configured to navigate the automatic guided vehicle to a product drop off station to drop off the products for further processing after the completion signal is received.

In another embodiment, a method of operating automatic guided vehicles to pick up products in a logistic facility is provided. The method receives a call request at a system controller from a product pick up station, determines travel times of the automatic guided vehicles to the product pick up station and sends a pick up request to the automatic guided vehicle having the shortest travel time. The method navigates the automatic guided vehicle that received the pick up request to the product pick up station where the products are picked up by the automatic guided vehicle, sends a completion signal to the system controller when the products have been picked up and navigates the automatic guided vehicle to a product drop off station to drop off the products for further processing.

DETAILED DESCRIPTION OF THE INVENTION

Figure 1:
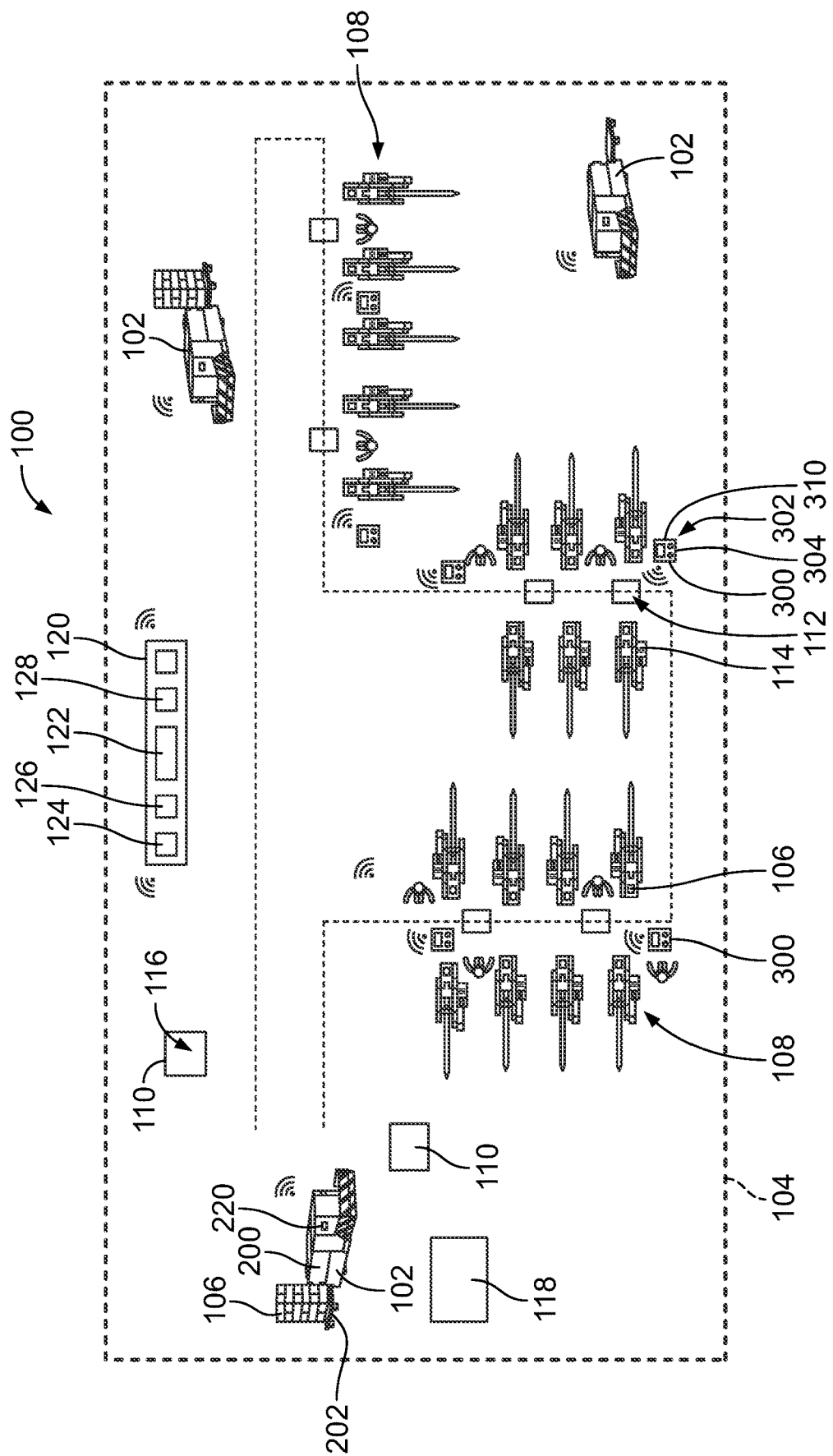
FIG. 1 is a schematic illustration of an autonomous product picking system using automatic guided vehicles (AGVs) in accordance with an exemplary embodiment.

FIG. 1 is a schematic illustration of an autonomous product picking system 100 in accordance with an exemplary embodiment. The autonomous product picking system 100 is used to control movements of one or more automatic guided vehicles (AGVs) 102 within a logistics facility 104, such as a warehouse, a distribution center, and manufacturing facility, a retail facility, and the like. The AGV 102 may be a mobile robot or autonomous mobile vehicle. In various embodiments, multiple AGVs 102 are used within the logistics facility 104 and controlled relative to each other by the autonomous product picking system 100. The AGVs 102 are automatically controlled and used for product pick up and product drop-off within the logistics facility 104.

In an exemplary embodiment, the AGVs 102 are used to pick up products 106 (for example, boxes, bins, individual parts, and the like) from one or more product pick up stations 108 and deliver the products 106 to one or more product drop off stations 110. In various embodiments, the product pick up stations 108 and/or the product drop off stations 110 may be manned working stations where an operator or user is stationed at the working station to perform a loading, unloading, sorting or other action.

In an exemplary embodiment, the product pick up station 108 includes a defined parking location 112 for the AGV 102. The AGV 102 navigates to the parking location 112 and stops at the parking location 112 for loading the product 106 onto the AGV 102 (either manually or automatically). The product pick up station 108 includes a processing machine 114 that processes the products 106. For example, the processing machine 114 may be a sorting machine for sorting parts, a forming machine for forming parts, a molding machine for molding parts, an assembly machine for assembling parts into an assembly, a packing machine for packing the parts into a box or bin, a labeling machine for labeling the products 106, and the like. In various embodiments, the product pick up station 108 may include multiple processing machines 114 adjacent the parking location 112. As such, the products 106 from the multiple processing machines 114 may be loaded onto the AGV 102 at a single stop and/or the products 106 may undergo multiple processing steps prior to loading onto the AGV 102 (for example, parts may be molded, other parts may be formed, the parts may be assembled, and many parts may be packaged into a box prior to loading the box onto the AGV 102).

In an exemplary embodiment, the product pick up station 108 includes a call station 300. The call station 300 is accessible to the operator to allow the operator to communicate with the autonomous product picking system 100. The call station 300 includes a user interface 302. The user interface 302 includes one or more activation buttons 304 configured to be activated by the operator. The operator may activate the activation buttons 304 to initiate certain operations. For example, the operator may activate the activation buttons 304 to make a call request for a product pick up by the AGV 102 at the product pick up station 108. The operator may activate the activation buttons 304 upon completion of the product pick up, such as when all of the products are loaded onto the AGV 102 to signal pick up completion and cause the AGV to move out of the product pick up station 108, such as to the product drop off station 110. The activation buttons 304 may be push buttons, toggle switches, and the like. In various embodiments, the user interface may be a touch screen. The user interface may be a keypad or keyboard. In various embodiments, the call station 300 may be mobile, such as being worn by or carried by the operator. The call station 300 includes a communication module 310 configured to communicate with other components of the autonomous product picking system 100. The communication module 310 may communicate wirelessly, such as via Wi-Fi.

In an exemplary embodiment, the product drop off station 110 includes a defined parking location 116 for the AGV 102. The AGV 102 navigates to the parking location 116 and stops at the parking location 116 for unloading the product 106 from the AGV 102 (either manually or automatically). The product drop off station 110 may include one or more processing machines (not shown) that processes the products 106. For example, the processing machine may be a sorting machine for sorting the products 106, a labeling machine for labeling the products 106, and the like.

In an exemplary embodiment, the logistics facility 104 includes a docking station 118 for the AGV 102. The docking station 118 may be used to store and or charge the AGV 102. In an exemplary embodiment, the AGV 102 returns to the docking station 118 after performing one or more tasks to recharge the AGV 102.

In an exemplary embodiment, the autonomous product picking system 100 includes a system control module 120 located within the logistics facility 104. The system control module 120 may include a circuit board or other control circuit to control operation of the autonomous product picking system 100. The system control module 120 may receive inputs and generate outputs to control operation of the autonomous product picking system 100.

In an exemplary embodiment, the system control module 120 includes a system communication module 122 communicatively coupled with the communication modules 310 of the call stations 300 and communicatively coupled to the AGVs 102. The system communication module 122 may communicate wirelessly with the communication modules 310 and the AGVs 102. The system communication module 122 may include an antenna for wireless communication. In other various embodiments, the system communication module 122 may communicate over a wired connection with the call stations 300, such as via a communication bus.

The system control module 120 is communicatively coupled to the product pick up stations 108 and/or the product drop off stations 110 to receive requests, tasks, status signals, and the like. For example, the system control module 120 may communicate with the communication modules 310 of the call stations 300 to receive signals and requests from the call stations 300. The system control module 120 is communicatively coupled to the AGVs 102 to control the AGVs 102 within the logistics facility 104, such as movement of the AGVs 102 to/from the stations 108, 110. The system control module 120 controls movement of the AGVs 102 between the multiple stations 108, 110. The AGVs 102 transport the products 106 autonomously from one location to another, such as between the stations 108, 110 based on control signals received from the system control module 120. In an exemplary embodiment, the system control module 120 is configured to receive manual calls or signals to perform a task at the product pick up stations 108. For example, an operator or user may manually activate the activations buttons 304 to call the AGVs 102 to the corresponding product pick up station 108, such as to pick up the products 106. The products 106 may be manually loaded or automatically loaded onto the AGV 102 for removal form the product pick up station 108. In an exemplary embodiment, the system control module 120 is configured to receive automated calls or signals to perform a task at the product pick up stations 108. The system control module 120 controls the AGVs 102 based on the manual signals and the automated signals.

In an exemplary embodiment, the system control module 120 includes one or more processors 124, 126, 128 for controlling the autonomous product picking system 100. The processors 124 and/or 126 and/or 128 receive inputs, perform calculations, make operation decisions, send outputs, and the like to control operations of the components of the autonomous product picking system 100. For example, the processors 124 and/or 126 and/or 128 may receive signals from the product pick up stations 108, from the product drop off stations 110, from the docking stations 110, from the AGVs 102, and the like. The processors 124 and/or 126 and/or 128 process the signals to control the AGVs 102. For example, the processors 124 and/or 126 and/or 128 navigate the AGVs 102 within the logistics facility 104 between the docking station 118 and the product pick up station 108, between the product pick up stations 108, between the product pick up station 108 and the product drop off station 110, and the like.

The AGV 102 includes a vehicle body 200, which may be a tugger used to pull a cart 202 that may be loaded with the products 106. In other various embodiments, the products 106 may be loaded directly onto the vehicle body 200 rather than a separate cart 202. The AGV 102 includes a motor driving wheels to move the AGV 102. The AGV 102 includes a battery coupled to the motor to power the motor.

In an exemplary embodiment, the AGV 102 includes an AGV controller 220 for controlling movement of the AGV 102. The AGV controller 220 is operably coupled to the motor to control movement of the AGV 102. The AGV controller 220 may control an ON/OFF mode of the motor, may control an operating speed of the motor, may control an operating direction of the motor, and the like. The AGV controller 220 is communicatively coupled to the system control module 120 (shown in FIG. 1) to receive control signals for operating the AGV 102. For example, the AGV controller 220 may communicate wirelessly with the system control module 120. The AGV controller 220 may receive route information to guide the AGV 102 along a particular path, such as between the docking station 118 and the product pick up station 108, between the product pick up stations 108, between the product pick up station 108 and the product drop off station 110, and the like. The AGV controller 220 may receive information instructing the AGV 102 to stop, to move forward, to move rearward, and/or to turn right or left for controlling movement of the AGV 102.

In various embodiments, the AGV 102 may include a collaborative manipulator (not shown), such as a robotic arm and a gripper used for picking up the products 106 and moving the products 106 to or from the cart 202. The collaborative manipulator may be a four-axis manipulating arm or a six-axis manipulating arm in various embodiments. In other various embodiments, other types of part manipulators may be utilized. For example, the collaborative manipulator may include a conveyor or other type of manipulator.

During operation of the autonomous product picking system 100, the AGVs 102 navigate autonomously from point-to-point within the logistics facility 104, under control of the system control module 120, to pick up the products 106, drop off the products 106, and return to the docking station 118. For example, the AGVs 102 moves along one or more paths through the logistics facility 104 between the docking station 118, the product pick up stations 108 and the product drop off stations 110. In an exemplary embodiment, the autonomous product picking system 100 controls the AGVs 102 to efficiently and quickly pick up the products 106 when the products 106 are ready for pick up. In various embodiments, the system control module 120 routes the AGVs 102 throughout the logistics facility 104 based on proximity of the AGVs 102 to the various product pick up stations 108. For example, control of the AGVs 102 may be based on travel times of the relative AGVs 102 to the product pick up stations 108.

Figure 2:
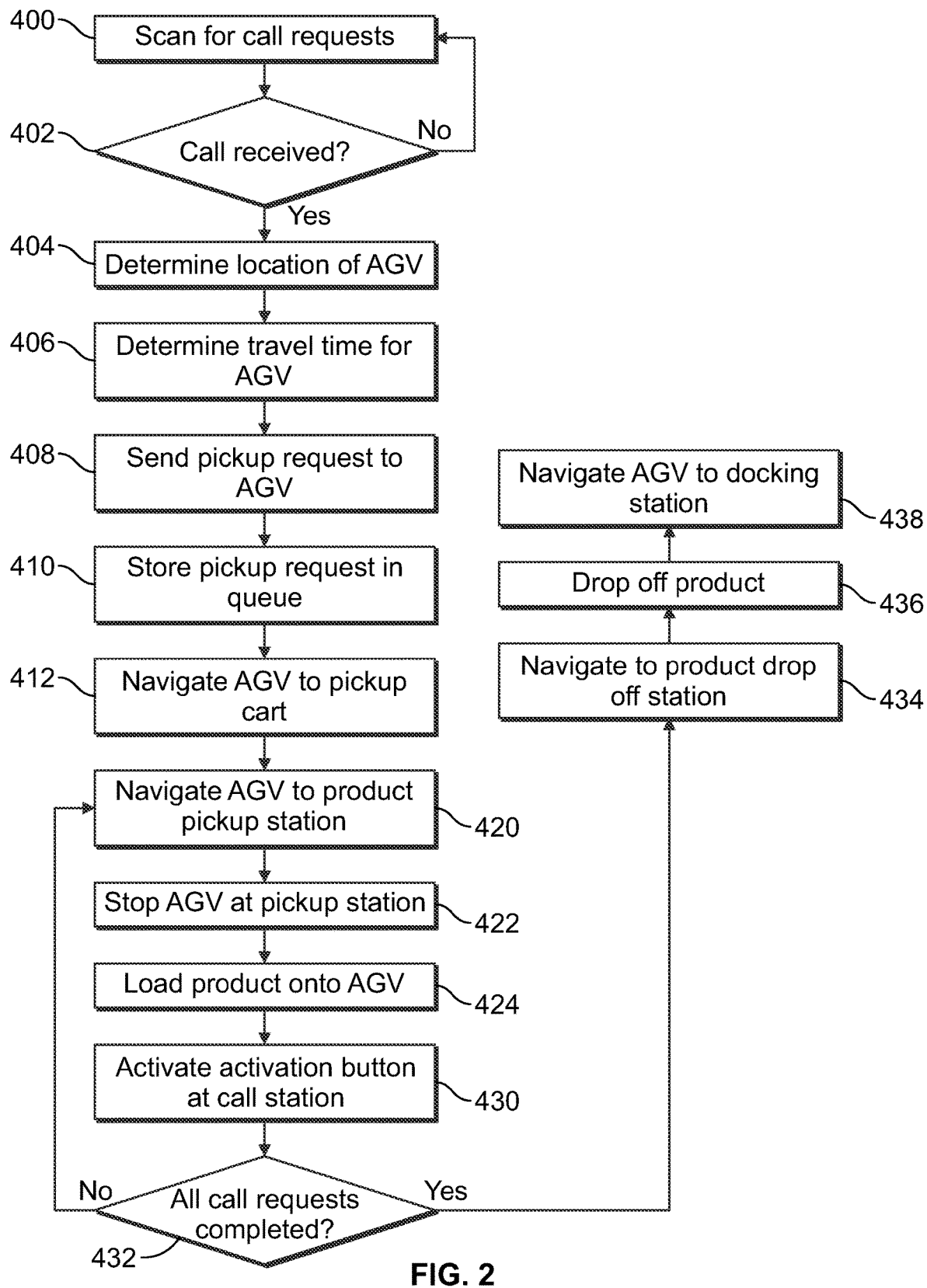
FIG. 2 is a flow chart showing a method of operating AGVs to pick up products in a logistics facility in accordance with an exemplary embodiment.

FIG. 2 is a flow chart showing a method of operating AGVs to pick up products in a logistics facility in accordance with an exemplary embodiment. The method may be performed by the autonomous product picking system to control the AGVs. In various embodiments, the method is used to control movements of one or more of the AGVs between the stations. In various embodiments, the method is used to prioritize movements of the AGVs between the stations, such as to reduce product pick up times from the stations and/or to reduce operator waiting time.

At 400, the method includes scanning for call requests from the call stations. In various embodiments, the system control module may periodically scan for call requests. In other various embodiments, the system control module may continuously scan for call requests. In other alternative embodiments, the call request scan may be triggered when the call requests are transmitted to the system control module. At 402, the system control module determines if a call request is been received. If no call request is received, the process returns to step 400.

At 404, when a call request is received, the system control module determines a location of the AGV. For example, the system communication module may transmit a locating signal to the AGV controller to determine the location of the AGV. The AGV may be located at the docking station, at one of the product pick up stations, at one of the product drop off stations, or in transit between the various stations. At 406, the system control module determines a travel time for the AGV to the product pick up station that sent the call request. The travel time is based on a distance between the AGV location and the product pick up station. At 408, the system control module sends a pickup request to the AGV to start the pickup process. For example, the system communication module may transmit the pickup signal to the AGV controller. At 410, the AGV stores the pickup request in a queue. At 412, the system control module may optionally navigate the AGV to an empty cart pickup location to pick up an empty cart for the products. The system control module may bypass step 412 if the AGV is already carrying a cart or if the products may be loaded directly onto the vehicle body of the AGV rather than a cart.

At 420, the system control module navigates the AGV to the product pick up station. For example, the system control module may send a guidance route to the AGV based on the current AGV location and the location of the product pick up station. At 422, the AGV is stopped at the product pick up station. At 424, the product is loaded onto the AGV. For example, the operator may manually load the product onto the AGV. Alternatively, the product may be automatically loaded onto the AGV, such as using a conveyor or a loading device, such as a robot at the product pick up station or a collaborative manipulator carried by the AGV.

At 430, the operator presses the activation button at the call station when the product is loaded. For example, when all of the packages have been loaded onto the AGV or when the AGV is fully loaded, the operator presses the activation button to send a completion signal to the system control module. At 432, the system control module determines if all call requests have been completed. For example, the system control module determines if the task queue of the AGV is complete. If the task queue is over the process returns to step 420 and the system control module navigates the AGV to the next product pick up station. If all call requests have been completed, the system control module navigates the AGV to the product drop off station at 434. At 436, the AGV drops off the products at the product drop off station. For example, the AGV may drop off the cart at the product drop off station to allow the AGV to continue moving to a new location in the logistics facility without the cart. The products may be manually unloaded or automatically unloaded using a machine or device. At 438, the system control module navigates the AGV to the docking station for recharging.

Figure 3:
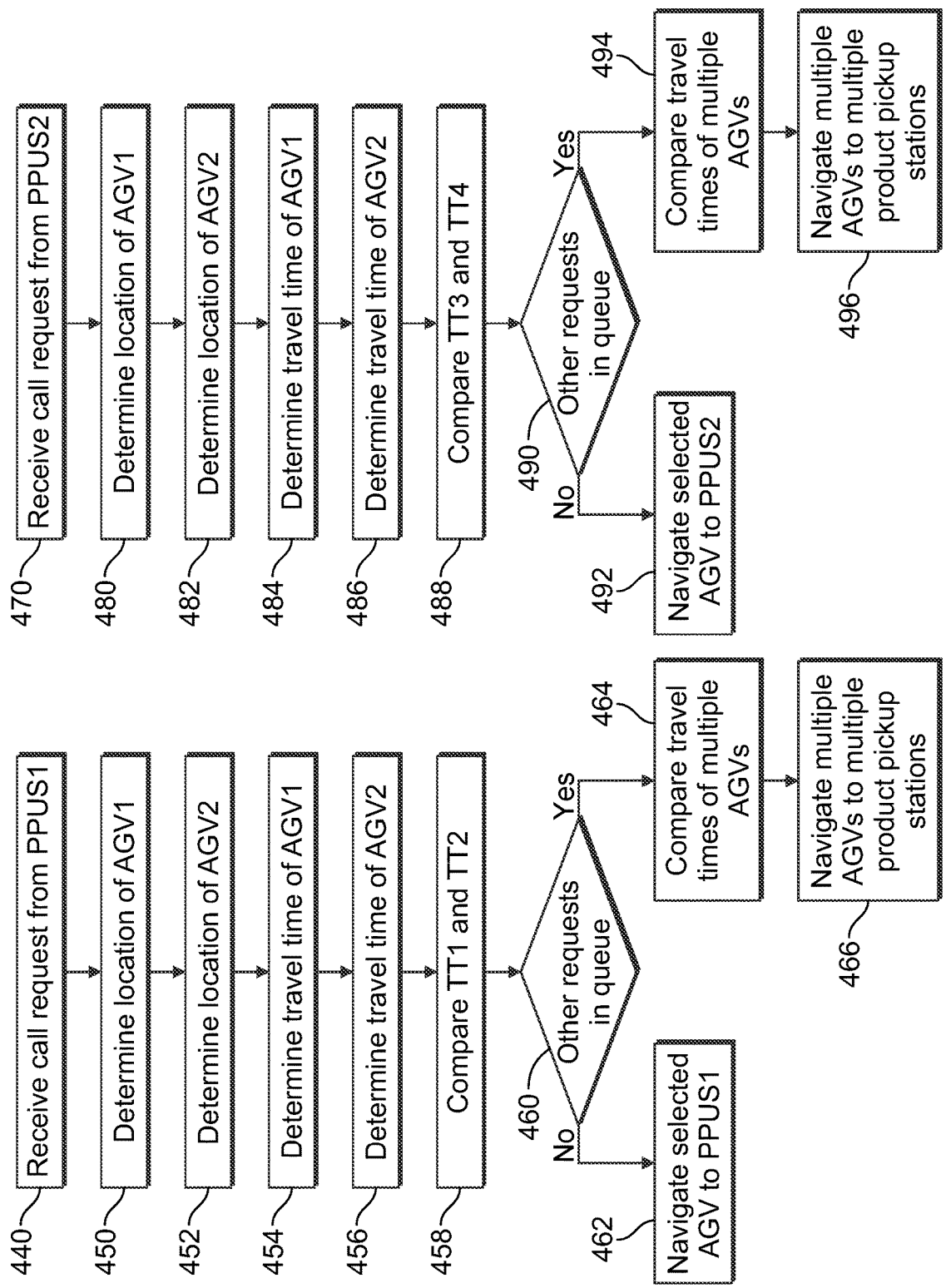
FIG. 3 is a flow chart showing a method of operating AGVs to pick up products in a logistics facility in accordance with an exemplary embodiment.

FIG. 3 is a flow chart showing a method of operating AGVs to pick up products in a logistics facility in accordance with an exemplary embodiment. The method may be performed by the autonomous product picking system to control the AGVs. The method may be used in addition to or in lieu of the method shown in FIG. 2. The method is used to control movements of first and second AGVs (AGV1 and AGV2) to pick up products at multiple product pick up stations, such as a first product pick up station PPUS1 and a second product pick up station PPUS2. The method may be expanded to control movements of additional AGVs or movements to additional product pick up stations. The method may be used to prioritize movements of the AGVs between the product pick up stations, such as to reduce wait time at the product pick up stations.

At 440, the system control module receives a call request from the first product pick up station PPUS1. For example, the call request may be transmitted from the call station at the PPUS1. The call request may be made by an operator activating the activation button at the call station when the products are ready for pick up.

At 450, the system control module determines a location of the first AGV (AGV1). At 452, the system control module determines a location of the second AGV (AGV2). The system control module may determine locations of additional AGVs. At 454, the system control module determines a travel time TT1 for AGV1 to the first product pick up station PPUS1. At 456, the system control module determines a travel time TT2 for AGV2 to the first product pick up station PPUS1. The travel times are based on distance between the AGV locations and the product pick up stations. At 458, the system control module compares TT1 and TT2 to determine which AGV is able to arrive at PPUS1 more quickly. At 460, the system control module determines if the selected AGV has other call requests in its queue. At 462, if no other requests are in the queue, the system control module navigates the AGV having the shorter travel time to the PPUS1. If another request is in the queue of the selected AGV, at 464 the system control module compares travel times of the multiple AGVs to the multiple product pick up stations and at 466 the system control module navigates the multiple AGVs to the multiple product pick up stations that would yield the least combined wait time at the multiple product pick up stations. As such, the AGVs may be redirected in route when new call requests are received.

At 470, the system control module receives a call request from the second product pick up station PPUS2. For example, the call request may be transmitted from the call station at the PPUS2. The call request may be made by an operator activating the activation button at the call station when the products are ready for pick up.

At 480, the system control module determines a location of the first AGV (AGV1). At 482, the system control module determines a location of the second AGV (AGV2). The system control module may determine locations of additional AGVs. At 484, the system control module determines a travel time TT3 for AGV1 to the second product pick up station PPUS2. At 486, the system control module determines a travel time TT4 for AGV2 to the second product pick up station PPUS2. The travel times are based on distance between the AGV locations and the product pick up stations. At 488, the system control module compares TT3 and TT4 to determine which AGV is able to arrive at PPUS2 more quickly. At 490, the system control module determines if the selected AGV has other call requests in its queue. At 492, if no other requests are in the queue, the system control module navigates the AGV having the shorter travel time to the PPUS2. If another request is in the queue of the selected AGV, at 494 the system control module compares travel times of the multiple AGVs to the multiple product pick up stations and at 496 the system control module navigates the multiple AGVs to the multiple product pick up stations that would yield the least combined wait time at the multiple product pick up stations. As such, the AGVs may be redirected in route when new call requests are received.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An autonomous product picking system for picking products from within a logistic facility comprising:
product pick up stations fixed at different locations within the facility;
call stations within the facility associated with the product pick up stations, each of the call stations including at least one activation button at a user interface configured to be activated by an operator to transmit call requests when the products are needed to be picked up from the product pick up stations and to transmit completion signals when the products have been picked up from the product pick up stations;
at least one product drop off station at a fixed location within the facility;
a docking station within the facility;
an automatic guided vehicle automatically controlled and guided around the facility, the automatic guided vehicle being movable within the facility between the product pick up stations, the at least one product drop off station, and the docking station within the facility; and
a system control module within the facility, the system control module having a system controller, the system controller configured to automatically guide the automatic guided vehicle within the facility between the product pick up stations, the at least one product drop off station and the docking station, the system control module further includes a system communication module having a wireless communicator, the wireless communicator communicatively coupled to the automatic guided vehicle and the call stations, the wireless communicator receiving the call requests from the call stations when the at least one activation button at the user interface is activated, the wireless communicator further receiving the completion signals from the call stations when the at least one activation button at the user interface is activated, wherein, when the call requests are transmitted by the call stations and received by the wireless communicator, the system controller is configured to automatically navigate the automatic guided vehicle to a product pick up station of the product pick up stations that a call request of the call requests is from and that has a shortest travel time for the automatic guided vehicle, wherein, when at least one new call request is transmitted by at least one of the call stations and received by the wireless communicator, the system controller is configured to automatically redirect the automatic guided vehicle traveling to the product pick up station and automatically navigate the automatic guided vehicle to a different product pick up station of the product pick up stations that one of the at least one new call request is from if navigating the automated guided vehicle to the different product pick up station has a shorter travel time than the travel time to the product pick up station to which the automated guided vehicle is being automatically navigated, and wherein the system controller automatically navigates the automatic guided vehicle to the at least one product drop off station to drop off the products for further processing after the products have been picked up from the product pick up stations.

2. The autonomous product picking system of claim 1, wherein the system controller determines travel times of the automatic guided vehicle to the product pick up stations each time the call requests are received, the system controller controlling navigation of the automatic guided vehicle to the product pick up stations based on the travel times.

3. The autonomous product picking system of claim 1, wherein the automatic guided vehicle is a first automatic guided vehicle, the autonomous product picking system further comprising a second automatic guided vehicle, the system controller sending the first automatic guided vehicle and the second automatic guided vehicle to the product pick up stations based on travel times between the product pick up stations and the first automatic guided vehicle and the second automatic guided vehicle.

4. The autonomous product picking system of claim 1, wherein the call requests include a first call request from a first product pick up station of the product pick up stations and a second call request from a second product pick up station of the product pick up stations, the system controller sending the automatic guided vehicle to the first product pick up station prior to the second product pick up station in a first control scheme, the system controller sending the automatic guided vehicle to the second product pick up station prior to the first product pick up station in a second control scheme.

5. The autonomous product picking system of claim 4, wherein the first control scheme is utilized when a travel time to the first product pick up station is less than a travel time to the second product pick up station, and wherein the second control scheme is utilized when the travel time to the second product pick up station is less than the travel time to the first product pick up station.

6. The autonomous product picking system of claim 1, wherein the automatic guided vehicle receives the call requests from the wireless communicator on the fly to revise navigation of the automatic guided vehicle when the call requests are received.

7. The autonomous product picking system of claim 1, wherein the at least one activation button is manually activated.

8. The autonomous product picking system of claim 1, wherein the completion signals are transmitted after the products are loaded onto a cart of the automatic guided vehicle.

9. The autonomous product picking system of claim 1, wherein the call stations communicate wirelessly with the wireless communicator of the system control module.

10. An autonomous product picking system for picking products from within a logistic facility comprising:

product pick up stations fixed at different locations within the facility;

call stations within the facility associated with the product pick up stations, each of the call stations including at least one activation button at a user interface configured to be activated by an operator to transmit call requests when the products are needed to be picked up from the product pick up stations and to transmit completion signals when the products have been picked up from the product pick up stations;

a docking station at a fixed location within the facility;

automatic guided vehicles automatically controlled and guided around the facility, the automatic guided vehicles being movable within the facility between the product pick up stations and the docking station; and a system control module within the facility, the system control module having a system controller, the system controller comprising:

one or more processors configured to determine travel times of all of the automatic guided vehicles to the product pick up stations;

one or more processors configured to send a first pick up request to a first automatic guided vehicle of the automatic guided vehicles in response to a first call request of the call requests from a first product pick up station of the product pickup stations, the first automatic guided vehicle having a first travel time of the travel times, the first travel time being a shortest travel time of the travel times to the first product pick up station;

one or more processors configured to automatically navigate the first automatic guided vehicle toward the first product pick up station;

one or more processors configured to send a second pick up request to a corresponding one of the automatic guided vehicles in response to a second call request of the call requests from a second product pick up station of the product pickup stations, wherein the second pick up request is sent to the first automatic guided vehicle when a travel time of the first automatic guided vehicle to the second product pick up station is a shortest travel time of the travel times to the second product pick up station to automatically redirect the first automatic guided vehicle traveling to the first product pick up station and automatically navigate the first automatic guided vehicle to the second product pick up station, and wherein the second call request is sent to a second automatic guided vehicle of the automatic guided vehicles when a travel time of the second automatic guided vehicle to the second product pick up station is the shortest travel time of the travel times to the second product pick up station; and one or more processors configured to automatically navigate the automatic guided vehicles to a product drop off station at a fixed location within the facility to drop off the products for further processing after the products have been picked up from the product pick up stations, wherein the one or more processors configured to automatically navigate the first automatic guided vehicle is further configured to automatically redirect the first automatic guided vehicle traveling to the first product pick up station to automatically navigate the first automatic guided vehicle to the second product pick up station when the system controller receives the second call request and the travel time of the first automatic guided vehicle to the second product pick up station is less than the first travel time of the first automatic guided vehicle to the first product pick up station.

11. The automatic guided vehicle system of claim 10, wherein the one or more processors configured to send the first pick up request to the first automatic guided vehicle is further configured to send multiple pick up requests to the first automatic guided vehicle.

12. The automatic guided vehicle system of claim 11, wherein the one or more processors configured to navigate the first automatic guided vehicle that received the multiple pick up requests is configured to navigate the first automatic guided vehicle to one of the product pick up stations having a least travel time of the travel times for the first automatic guided vehicle.

13. A method of operating automatic guided vehicles to pick up products in a logistic facility, the method comprising:

receiving a first call request at a system controller within the facility having one or more processors from a first product pick up station fixed at a location within the facility;

determining, by the system controller, travel times of all of the automatic guided vehicles to the first product pick up station;

sending a pick up request from the system controller to a first automatic guided vehicle of the automatic guided vehicles based on the travel times, the first automatic guided vehicle having a first travel time of the travel times to the first product pick up station, wherein the first travel time is a shortest travel time;

causing, by the system controller, the first automatic guided vehicle to automatically navigate toward the first product pick up station;

receiving a second call request at the system controller from a second product pick up station fixed at another location within the facility, wherein product pick up stations including the first product pick up station and the second product pick up station are associated with call stations within the facility, each of the call stations including at least one activation button at a user interface configured to be activated by an operator to transmit call requests including the first call request and the second call request when the products are needed to be picked up from the product pick up stations and to transmit completion signals when the products have been picked up from the product pick up stations;

determining, by the system controller, travel times of all of the automatic guided vehicles to the second product pick up station, wherein the first automatic guided vehicle traveling to the first product pick up station is automatically redirected and automatically navigated to the second product pick up station when a travel time of the first automatic guided vehicle to the second product pick up station is a shortest travel time of the travel times to the second product pick up station;

when a travel time of a second automatic guided vehicle of the automatic guided vehicles to the second product pickup station is the shortest travel time of the travel times to the second product pickup station, sending a pick up request from the system controller to the second automatic guided vehicle and causing, by the system controller, the second automatic guided vehicle to automatically navigate toward the second product pick up station; and causing, by the system controller, the automatic guided vehicles to automatically navigate to a product drop off station at a fixed location within the facility to drop off the products for further processing after the products have been picked up, wherein the automatic guided vehicles are automatically controlled and guided around the facility, the automatic guided vehicles being movable within the facility between the product drop off station and the product pick up stations, and wherein the first automatic guided vehicle traveling to the first product pick up station is automatically redirected and automatically navigated to the second product pick up station further when the system controller receives the second call request from the second product pick up station and the travel time of the first automatic guided vehicle to the second product pick up station is less than the first travel time of the first automatic guided vehicle to the first product pick up station.

14. The method of claim 13, wherein said sending the pick up request to the first automatic guided vehicle comprises sending multiple pick up requests to the first automatic guided vehicle from the product pickup stations.

15. The method of claim 14, further comprising: when the multiple pick up requests are received, navigating the first automatic guided vehicle to a closest one of the product pick up stations, the closest one of the product pick up stations having a least travel time thereto for the first automatic guided vehicle.

* * * * *